(12) United States Patent
Carr

(10) Patent No.: US 9,992,399 B2
(45) Date of Patent: Jun. 5, 2018

(54) SYSTEM, METHOD AND APPARATUS FOR INDEPENDENTLY CONTROLLING DIFFERENT CAMERAS FROM A SINGLE DEVICE

(71) Applicant: Alex B. Carr, Burbank, CA (US)

(72) Inventor: Alex B. Carr, Burbank, CA (US)

(*) Notice: Subject to any disclaimer, the term of this patent is extended or adjusted under 35 U.S.C. 154(b) by 0 days. days.

(21) Appl. No.: 15/004,715

(22) Filed: Jan. 22, 2016

(65) Prior Publication Data

US 2017/0214842 A1    Jul. 27, 2017

(51) Int. Cl.
*H04N 5/232* (2006.01)
*H04N 5/247* (2006.01)
*H04N 19/102* (2014.01)

(52) U.S. Cl.
CPC ..... *H04N 5/23203* (2013.01); *H04N 5/23216* (2013.01); *H04N 5/247* (2013.01)

(58) Field of Classification Search
CPC . H04N 5/23203; H04N 5/23216; H04N 5/247
USPC ............. 348/114, 211.99, 211.8, 211.14
See application file for complete search history.

(56) References Cited

U.S. PATENT DOCUMENTS

| | | | | |
|---|---|---|---|---|
| 6,675,386 B1* | 1/2004 | Hendricks | .......... | H04N 7/17318 348/143 |
| 8,340,654 B2* | 12/2012 | Bratton | .................. | H04N 5/232 348/211.11 |
| 9,503,626 B2* | 11/2016 | Chang | ................ | H04N 5/23203 |
| 2009/0027495 A1* | 1/2009 | Oskin | ............... | G08B 13/19656 348/143 |
| 2010/0304731 A1* | 12/2010 | Bratton | .................. | H04N 5/232 455/420 |
| 2012/0075469 A1* | 3/2012 | Oskin | ............... | G08B 13/19656 348/143 |
| 2012/0240224 A1* | 9/2012 | Payne | .................. | H04L 63/102 726/21 |
| 2012/0314018 A1* | 12/2012 | Wengrovitz | ........... | H04N 7/181 348/14.08 |
| 2015/0015723 A1* | 1/2015 | Huang | ............... | H04N 5/23222 348/207.1 |
| 2015/0106614 A1* | 4/2015 | Lee | ..................... | G06F 21/6263 713/150 |
| 2016/0148384 A1* | 5/2016 | Bud | ................... | G06K 9/00255 348/207.11 |

* cited by examiner

*Primary Examiner* — Hung Lam
(74) *Attorney, Agent, or Firm* — Omni Legal Group; Omid E. Khalifeh

(57) ABSTRACT

A method, system, and apparatus are provided that enable control of multiple cameras, and even multiple types of cameras, from a single device. Responsive to linking a camera to the controller, a unique control panel is generated to display settings and status information associated with said camera. As additional cameras are added, additional control panels are generated respective to each linked camera. A navigable display on the controller then enables a user to optionally access each control panel so that he may assess the respective camera's status and optionally adjust the respective camera's settings from a single device.

12 Claims, 9 Drawing Sheets

SYSTEM, METHOD AND APPARATUS FOR INDEPENDENTLY CONTROLLING DIFFERENT CAMERAS FROM A SINGLE DEVICE

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material that is subject to copyright protection. This patent document may show and/or describe matter that is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to remotely controlling cameras, and more particularly, to systems and methods for remotely and independently controlling multiple different types of video-recording cameras from a single device.

BACKGROUND

It is sometimes desirable to use multiple video cameras in different positions to simultaneously record a particular scene or event. This is known as a multiple-camera, or multicam, setup in the field of filmmaking and is sometimes preferred to a single-camera setup because it allows multiple shots to be recorded from a single performance without having to reset actors, lights, and props, re-perform and re-record the scene. This is known to save time during production and also in editing because it reduces various difficulties that arise when attempting to maintain continuity when reshooting scenes from different angles. Indeed, many live film productions and other regularly broadcast shows utilize multi-cam setups because of their time-efficiency.

Typically, a director, assistant director, director of photography, or assistant of photography supervises camera operators on set, but none have yet had the ability to access and control operation of each of the cameras in a multi-cam setup from a single device.

Some solutions to address this problem have been proposed. For example, software to control multiple same-type cameras from a single personal computer is known to those skilled in the art. Such software may aid production of three-dimensional special effects, stereo sound and video capture, and even panoramic photography. Remote controls have also been suggested for powering multiple cameras on and off as needed. For example, U.S. Pat. No. 6,463,215 to O'Connolly et al. teaches sequentially and remotely triggering of a plurality of cameras to capture videos and images. These solutions are deficient, though, because other camera settings, such as frame rate, white balance, and others, are not adjustable from such remotes.

Other remote control devices have been suggested to independently control multiple appliances as well. For example, U.S. Pat. No. 6,650,248 to O'Donnell et al. teaches methods of programming a universal home remote control device, such as for a home theater, by providing an interactive display of menus and prompts, and U.S. Pub. No. 2011/0211584 filed by Mahmoud teaches a universal controller-like hub for integrated control of various home devices and applications in the area of telephony, data processing, and multimedia, among others. But of course, neither of these remote control proposals is sufficient to independently control multiple different video recording devices.

Although various proposals have been made to solve the problem, none of those in existence combine the characteristics of the present invention. Therefore, there is a need for apparatuses, systems and methods to enable remote controlled operation of different cameras, including different types of cameras, from a single device.

SUMMARY

The present disclosure is directed to systems, methods and apparatuses for independently controlling multiple types of cameras, especially cameras capable of recording video, from a single device.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In some embodiments, the method, system, and apparatus for independently controlling operation of multiple cameras permits users to remotely power on and off, control playback, view the status of and adjust settings of, and perform other desirable functions for multiple and different types of cameras capable recording motion pictures. As such, it is not necessary that each of the cameras linked to the controller be the same type as or subject to the same settings or adjustments as every other linked camera.

By way of example, a user may be a director of photography or cinematographer supervising or otherwise participating in filming on a set such as a that associated with a movie, television, studio, or any other setting where video recordings may be made. In such instances, it is known that users may be required to monitor a plurality of cameras filming various aspects of the same scene. Indeed, it is even possible that different types of cameras may be used to variously capture the scene.

The controller may be embodied as any remote control, such as a hand-held radio or infrared transmitter, known in the art. More particularly, the controller may be an electronic circuit assembled as a common unit. In some embodiments, it may be embodied as an application or other computer program product enabled by a mobile electronic device or even personal computing device such as a personal, laptop, or tablet computer or even a smartphone. In any event, the controller may comprise a housing, a power source such as a removable battery or DC power supply, and touch sensitive display.

An embodiment of a system for controlling a plurality of cameras includes a plurality of digital recording devices, such as be any of various video-capable cameras, linked via a communication network to a single controller. In some embodiments, the video-capable cameras may be chosen any of studio cameras, camcorders, electronic news gathering video cameras, electronic field production cameras, remote cameras, and even video capable DSLR or mirrorless cameras known in the art. Of course, other video-capable cameras are known to those skilled in the art as well, even, for example, those integrated with ubiquitous smart mobile phones. Thus, one skilled in the art will recognize that innumerable cameras are available for use with the system.

It is contemplated that the communications network may use one or more of various communications types such as, for example and without limitation, wired internet communications, such as those enabled by an Ethernet cable, and wireless internet communications, such as Wi-Fi. As such, in some embodiments, the controller may additionally comprise a serial port and/or Ethernet port for transferring information such as camera-identifying and setting information between individual cameras and the controller.

Responsive to linking a camera to the controller, a unique control panel is generated to display settings and status information associated with said camera. As additional cameras are added, additional control panels respective to each linked camera may be generated. A navigable display on the controller then enables a user to optionally access each control panel so that he may assess the respective camera's status and optionally adjust the respective camera's settings from a single device.

It is contemplated that cameras may be simultaneously and communicatively linked to the camera, and also controlled separately from one other. In other words, using a control device, in accordance with one embodiment of the invention, to adjust or view settings that define the operation of one of the cameras linked to the device avoids adjusting or viewing settings defining the operation of any of the other cameras linked to the device. Thus the control device, or controller, may be used to independently operate a plurality of cameras.

In some embodiments, the display of the controller may enable a user to navigate through various menus as well as alternatively access each of the control panels respectively associated with the cameras linked to the controller. For instance, a main menu may be provided that comprises commands selectable on the touch-sensitive display to, for instance, select and/or identify a camera, link or connect the camera to the controller, disconnect the camera from the controller, and even navigate to other embodiments of the display. In some embodiments, a keypad may be provided to enable a user to enter information, such as a camera's serial number, his own identifying credentials, and/or other information, which may be displayed in a text box.

Next, each control panel associated with each camera linked to the controller may be accessed from the main menu. More particularly, there may be one (1) control panel generated in the event that a single camera is linked to the controller. Likewise, there may be two (2) control panels generated in the event that two (2) cameras are linked to the controller, three (3) control panels generated in the event that three (3) cameras are linked and so on for as many cameras as a user wishes to link to the controller. Thus it is contemplated that one each of the control panels will respectively display status information and enable control of one each of the linked cameras.

Each control panel may be optionally and alternatively selected from, for example, the main menu to populate the display of the controller. In other embodiments, each control panel may be optionally and alternatively selected from whichever screen populates the display at the time of use, such as another of the cameras' control panels.

Each control panel may also display information such as the status of the camera and various camera settings. In addition, various commands affecting the operation of the camera associated with a particular control panel may be available to the user. For example, from a selected control panel, a user may cause the controller to instruct the camera associated with the selected control panel to record video footage, playback a recording previously made from the associated camera, and change various settings on the associated camera. Owing to the fact that different types of cameras may be linked to the device, it is contemplated that the status information presented and any controllable settings may vary from each camera to each other camera. Thus the particular form and content of the status information, as well as the quantity and types of settings presented for each camera does not limit the disclosure.

Settings may comprise, for example and without limitation, frames per second, shutter speed, white balance, ISO, whether the camera is recording in color or black and white, a time code, and resolution, among others. The settings may be adjustable or not depending on the camera connected to the controller. In some embodiments, a setting that is changeable from the control panel associated with a linked camera may be made accessible to the user by a selectable button. Specifications, such as industry-standard values, associated with the setting may further be displayed on the control panel in conjunction with its respective selectable button. In some embodiments, selectable buttons may also be provided to allow a user to play footage recorded from an associated camera, and even return to the main menu discussed above.

Other features may be presented along with the control panel and other menus displayed by the controller. For example, an identifying character or other means of distinction may also be displayed on each of the generated control panels to indicate which of any linked cameras are associated with the displayed control panel.

In an embodiment, each of the control panels generated for one each of the linked cameras may be defined by a plurality of settings unique to each camera, such as those discussed above, may be accessed. In practice, from a control panel associated with any one of the cameras linked to the controller, a user may access and adjust the camera's settings. Similarly, from a control panel associated with another of the cameras, a user may access an adjust the other camera's settings. Indeed, the same may be done for each camera linked to the controller.

An embodiment of a method for independently controlling different cameras from a single device, such as the controller, includes the steps of: receiving camera information connecting the camera to controller device, generating a digital control panel unique to the connected camera, receiving a user input designating selection of the connected camera, displaying the camera's unique control panel, receiving setting specifications for the selected camera, and transmitting setting specifications to the selected camera. When a user wishes to connect or link one or more additional cameras to the controller, the steps of receiving information corresponding to the additional camera, connecting the camera to the controller, and generating a control panel for the connected camera may be repeated for each additional camera. Then, a user may input setting specifications for the one or more additional cameras linked to the controller. In such cases, the steps of displaying a control panel unique to the selected camera, receiving setting specifications for the selected camera, and transmitting setting specifications to the selected camera may be repeated as desired.

Thus, it is one object of the invention to enable control of multiple cameras from a single device.

It is another object of the invention to enable control of multiple different types of cameras from a single device.

It is still another object of the invention to permit independent control of each camera connected to a controller.

One or more of the above-disclosed embodiments, in addition to certain alternatives, are provided in further detail below with reference to the attached figures. The disclosed subject matter is not, however, limited to any particular embodiment disclosed.

Figure 1:
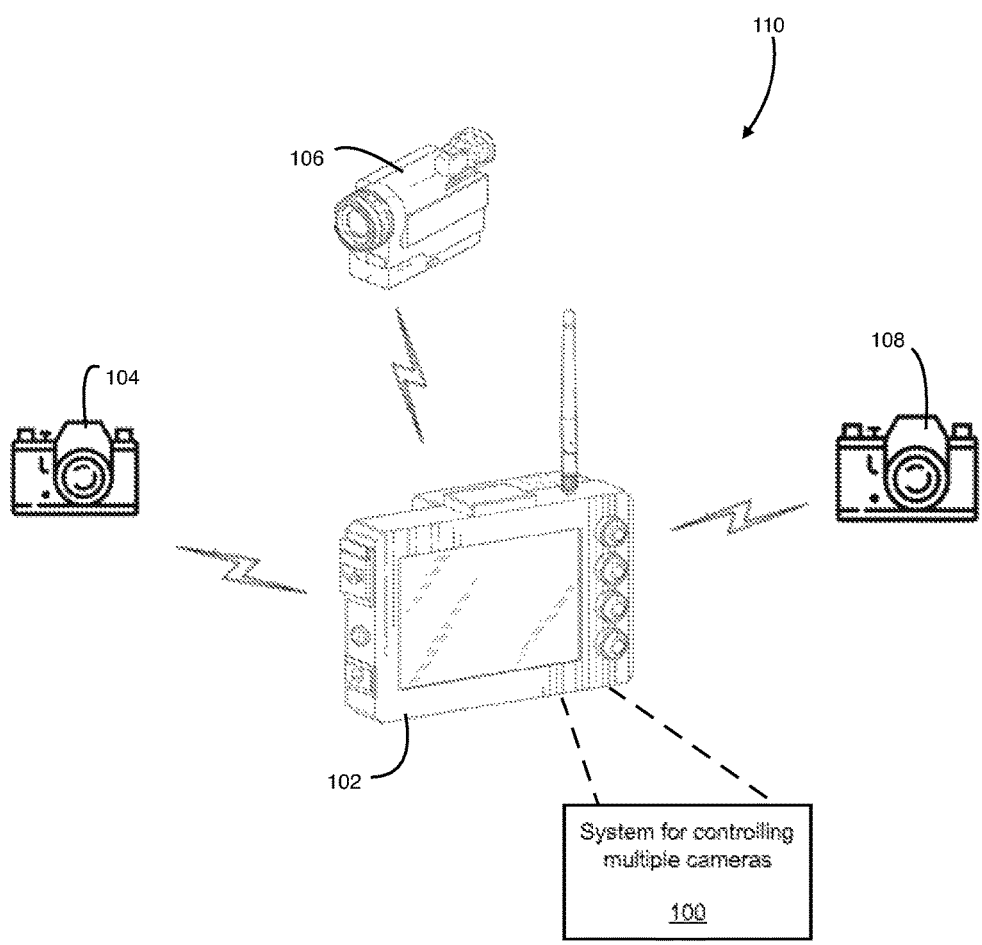
FIG. 1 is a diagram of a networked environment in which an exemplary embodiment of a system for controlling a plurality of different types of video recorders is implemented.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

An embodiment of a method and system for controlling multiple cameras in a networked environment is now described followed by a discussion of the operation of various components within the system. In this regard, FIG. 1 is a block diagram of a networked environment in which an exemplary embodiment of a system for controlling a plurality of cameras is implemented. More particularly, an embodiment of the system 100 includes a plurality of digital recording devices communicatively linked to a single controller 102.

By way of example, and not limitation, the digital recording devices may be any of various video-capable cameras, and in FIG. 1 are drawn as three cameras 104, 106, 108 coupled via a communication network 110. Each of the cameras 104, 106, 108 may be embodied as a digital motion picture camera such as, for example and without limitation, a studio camera, camcorder, electronic news gathering video camera, electronic field production camera, remote camera, and even video capable DSLR or mirrorless camera. Of course, other video-capable cameras are known to those skilled in the art, even, for example, those integrated with so-called "smart" mobile phones. Thus it is to be understood that the foregoing list is offered by way of example only and not of limitation.

Figure 2:
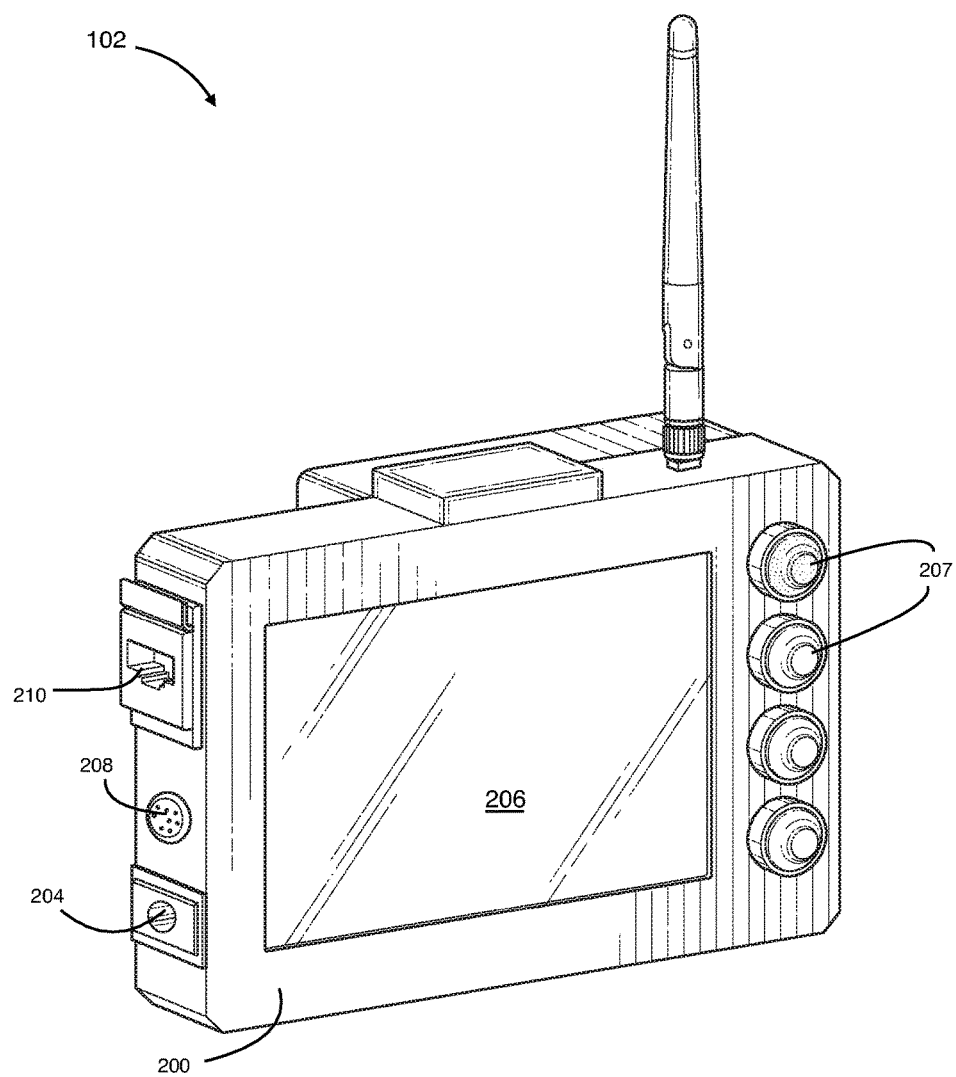
FIG. 2 is a front perspective view of the controller according to one embodiment of the invention.
Figure 3:
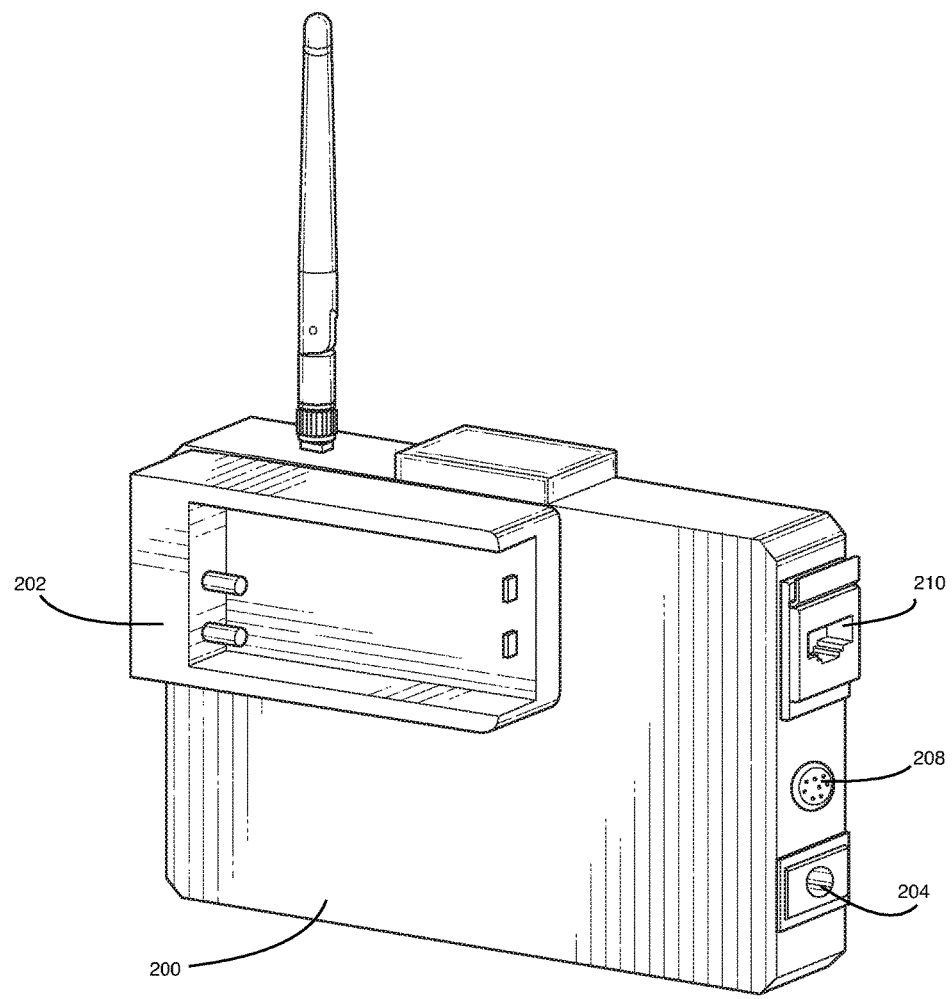
FIG. 3 is a rear perspective view of the controller according to one embodiment of the invention.

The controller may be embodied as any remote control, such as a hand-held radio or infrared transmitter, known in the art. With reference to FIGS. 2 and 3, the controller may be an electronic circuit assembled as a common unit, and in one embodiment, the controller 102 may comprise a housing 200 a power source, such as a removable battery mateable with a battery plate 202 or even DC power supply 204, and a display 206. The display may be touch sensitive and may enable user interaction with various functionality achieved by the controller 102. One or more buttons 207 may also be provided to permit user navigation of the controller's 102 functionality. Notably, the communications network in FIG. 1 can use one or more of various communications types for linking the controller 102 to the cameras 104, 106, 108 such as, for example and without limitation, wired internet communications, such as using an Ethernet cable, and wireless internet communications such as Wi-Fi. Thus, returning FIGS. 2 and 3, the controller may further comprise a serial port 208 and/or Ethernet port 210.

Figure 4:
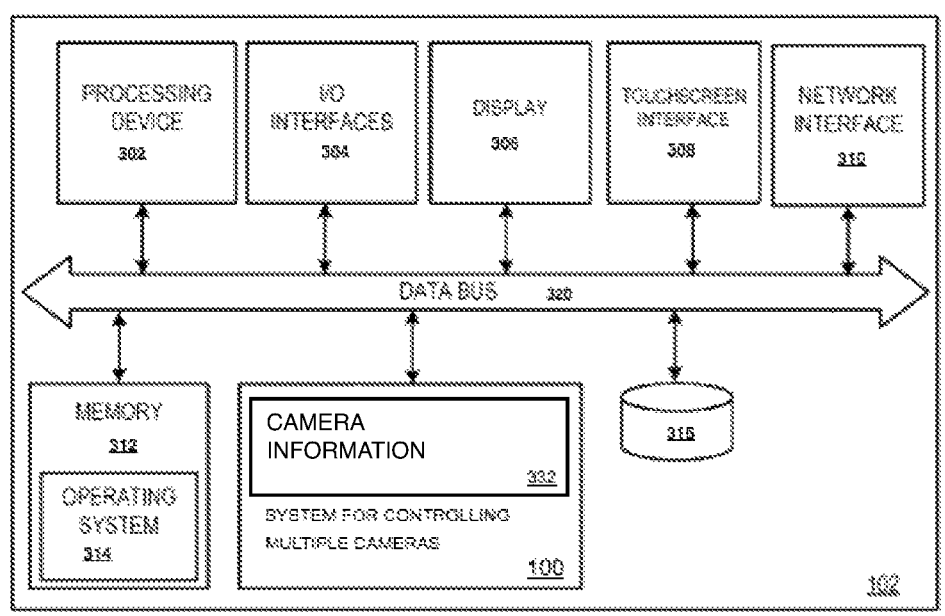
FIG. 4 illustrates an additional exemplary embodiment of the controller.

FIG. 4 illustrates another embodiment of the controller 102 from FIGS. 1-3. As described earlier, the controller 102 may be a remote control. It is also contemplated, however, that the controller may be embodied as a tablet computer, smartphone, or any one of a wide variety of wired and/or wireless computing devices. In any event, the controller 102 includes a processing device (processor) 302, input/output interfaces 304, a display 306, a touchscreen interface 308, and a network interface 310 with each communicating across a local data bus 320. In some embodiments, the controller may also comprise a memory 312, an operating system 314, and a mass storage 316. Additionally, controller 102 incorporates the system for independently controlling multiple, or different, cameras 100, which is depicted as including camera information 332, such as status and setting information, although the location of information 332 could vary.

The processing device 302 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

In some embodiments, the memory 312 can include any one of a combination of volatile memory elements (e.g., random-access memory (RAM, such as DRAM, and SRAM, etc.)) and nonvolatile memory elements. The memory typically comprises native operating system 314, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 3, the system and method for controlling different cameras from a single device 100 may be resident in memory such as memory 312.

Touchscreen interface 308 corresponding to the display 206 depicted in FIGS. 2 and 3, may be configured to detect contact within the display area of the display 306 and provides such functionality as on-screen buttons, menus, keyboards, etc. that allows users to navigate user interfaces by touch.

With further reference to FIG. 4, one of ordinary skill in the art will appreciate that the memory 314 can, and typically will, comprise other components which have been omitted for purposes of brevity. Note that in the context of this disclosure, a non-transitory computer-readable medium stores one or more programs for use by or in connection with an instruction execution system, apparatus, or device. The network interface 310 comprises various components used to transmit and/or receive data over a networked environment such as depicted in FIG. 1. When such components are embodied as an application, the one or more components may be stored on a non-transitory computer-readable medium and executed by the processing device.

Returning to FIG. 1, the network 110 enables a user to independently control cameras 104, 106 and 108 by communicatively linking each camera to a single control device, or controller 102. In one embodiment, a plurality of video-capable cameras may be communicatively linked, or added to the communication network 110, by prompting a user to use the controller 102 to identify the type of each camera to be linked. A prompt to identify the type of camera to be linked from the controller 102 may comprise instructions to the enter a serial number or other unique information identifying the particular camera. More particularly, a user may be prompted to identify the type of camera he wishes to link in the network 110 by name. In some embodiments, an identifying name of the camera may be the trade name and model name and number used for identifying such cameras in the market. For example, and without limitation, a camera name may be Sony® HXR-MC2500, ARRI® ALEXA, and Panasonic® AWE860. Of course, one skilled in the art will recognize that many other and different types of cameras are available in the marketplace and may communicatively linked to the controller 102. A user may be further prompted or instructed to identify the camera to be linked by providing a serial number or other identifier unique to the individually selected camera to be linked.

Upon communicatively linking a camera as described above, a user may choose to link one, two, three, or even more cameras to the controller 102 in like manner. It is to be understood that any second, third, or more cameras linked in the communication network 110, need not be the same type of camera as any other in the network 110. In addition, regardless of how such a communication network is implemented (be it web-based or not), the functionality of concern involves the ability to separately control a plurality of cameras from the device. Indeed, one skilled in the art will recognize that different types of cameras may be used to simultaneously record a particular scene.

In some embodiments, access to the network 110 may be restricted to certain, previously identified users. For example, it may be desirable to restrict control of a plurality of cameras through the communication network 110 to previously identified users who are have been trained or are otherwise qualified or permitted to operate professional, video-capable recording equipment on set. Such qualified users may be directors of photography or cinematographers, and it is contemplated that restricting access in this manner may support the effect of centralizing camera control in a single device by centralizing authority to control the device in only preselected users. Thus, in some embodiments, the communication network may be accessed or facilitated by user credentials comprising information identifying such qualified individuals. Of course, it is contemplated that amateur filmographers, directors, and other users may also access and make use of the controller 102 as well. Still, in one embodiment, the communication network 110 is facilitated by confirming the identity of each camera to be linked in the network 110, and if desired, confirming the identity of the user who will utilize the controller 102 to control any connected cameras.

In operation, the system 100 facilitates independent control of a plurality of cameras, even different types of cameras, that are capable of recording video footage. Specifically, the system 100 generates a control panel unique to each camera communicatively linked to the control device, or controller 102, that in turn displays that assorted information associated with that camera, including status information along and any settings defining the operation of the camera. Such system for independently controlling multiple cameras 100 can be implemented in numerous ways.

Figure 5:
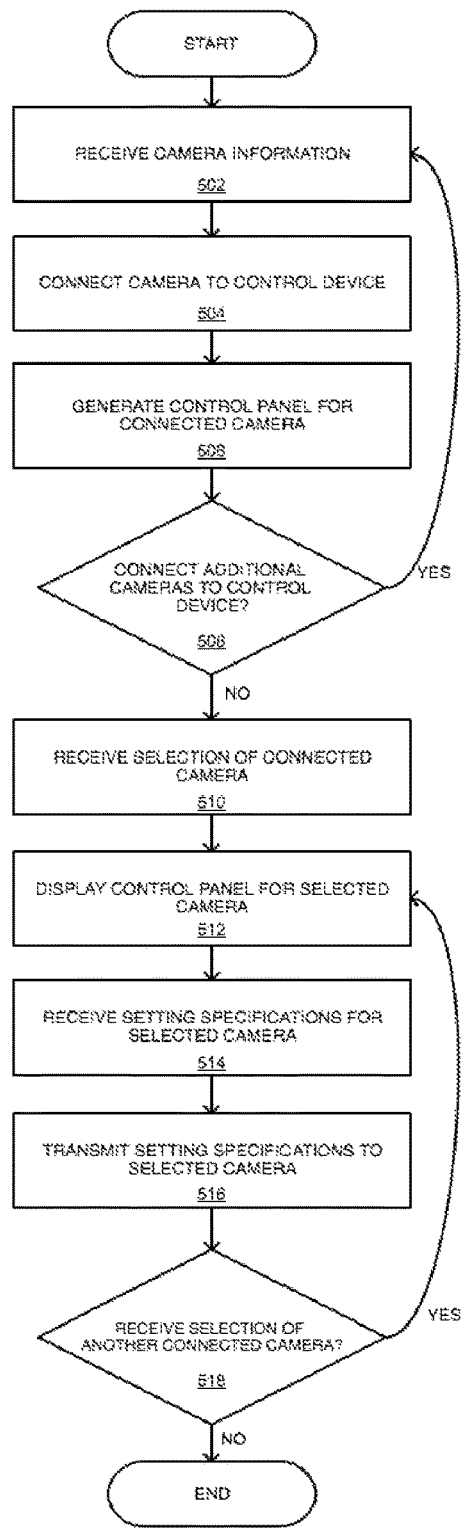
FIG. 5 is a flowchart depicting an exemplary embodiment of how a method for controlling a plurality of different types of video recorders may be performed on the controller.

For example, FIG. 5 is a flowchart depicting an exemplary embodiment of a method for independently controlling different cameras as may be performed by the controller 102 depicted in FIGS. 1 through 4. As shown in FIG. 5, the method includes the steps of: receiving camera information (block 502); connecting the camera to controller device (block 504); generating a digital control panel unique to the connected camera (block 506); receiving a selection of the connected camera (block 510); displaying the camera's unique control panel (block 512); receiving setting specifications for the selected camera (block 514); and transmitting setting specifications to the selected camera (block 516). It is to be understood that the controller is operable to control multiple different types of cameras simultaneously linked to it. As such, when a user wishes to connect one or more additional cameras to the controller (block 508), the steps of receiving information corresponding to the additional camera (block 502); connecting the camera to the controller (block 504); and generating a control panel for the connected camera (block 506) may be repeated for each additional camera.

Likewise, a user may also choose to input setting specifications (discussed in further detail below) for one or more additional cameras. Thus, the steps of displaying a control panel unique to the selected camera (block 512), receiving setting specifications for the selected camera (block 514), and transmitting setting specifications to the selected camera (block 516) may be repeated as desired.

Figure 6:
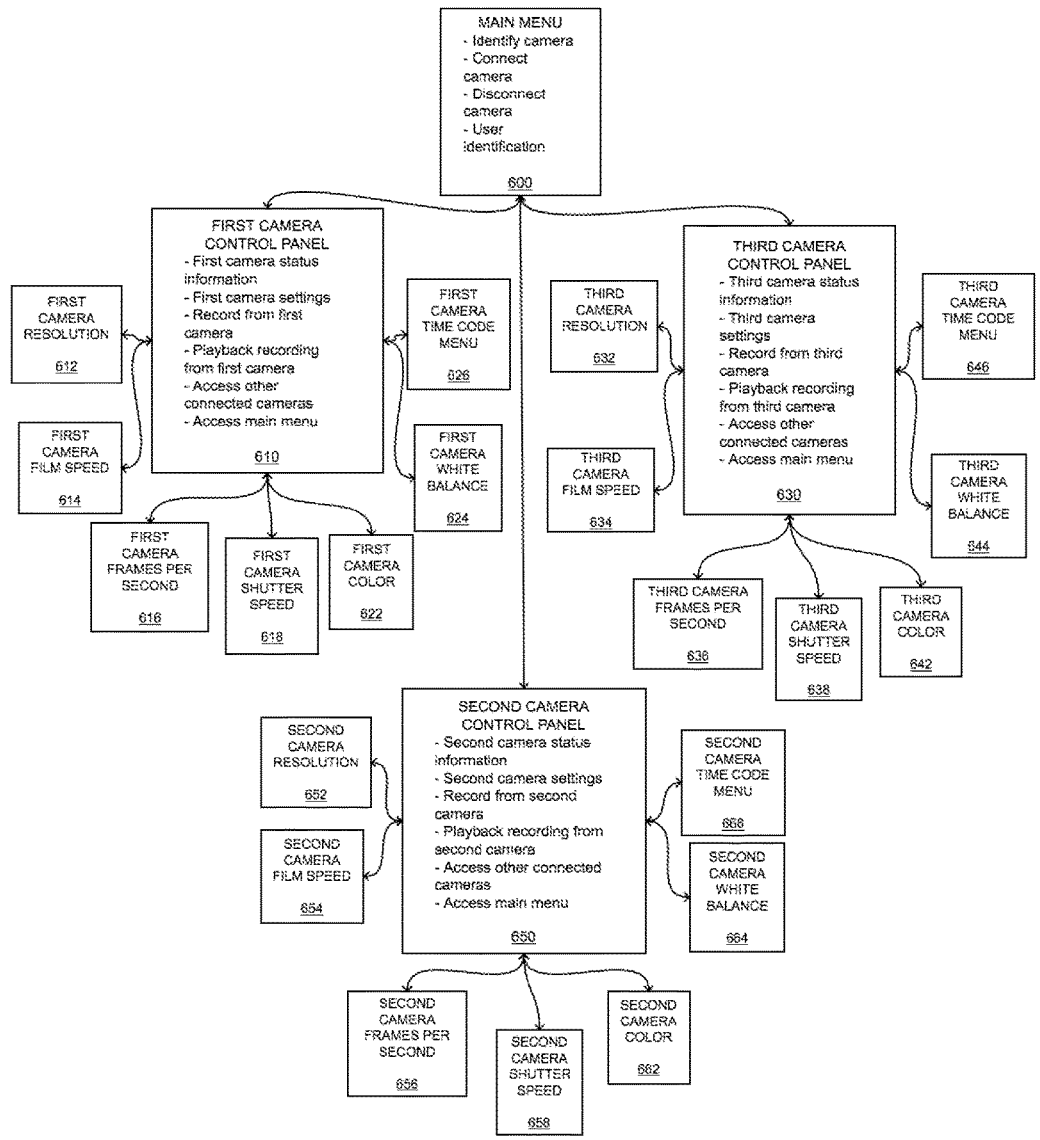
FIG. 6 is a flowchart depicting an exemplary user interface according to one embodiment.
Figure 7:
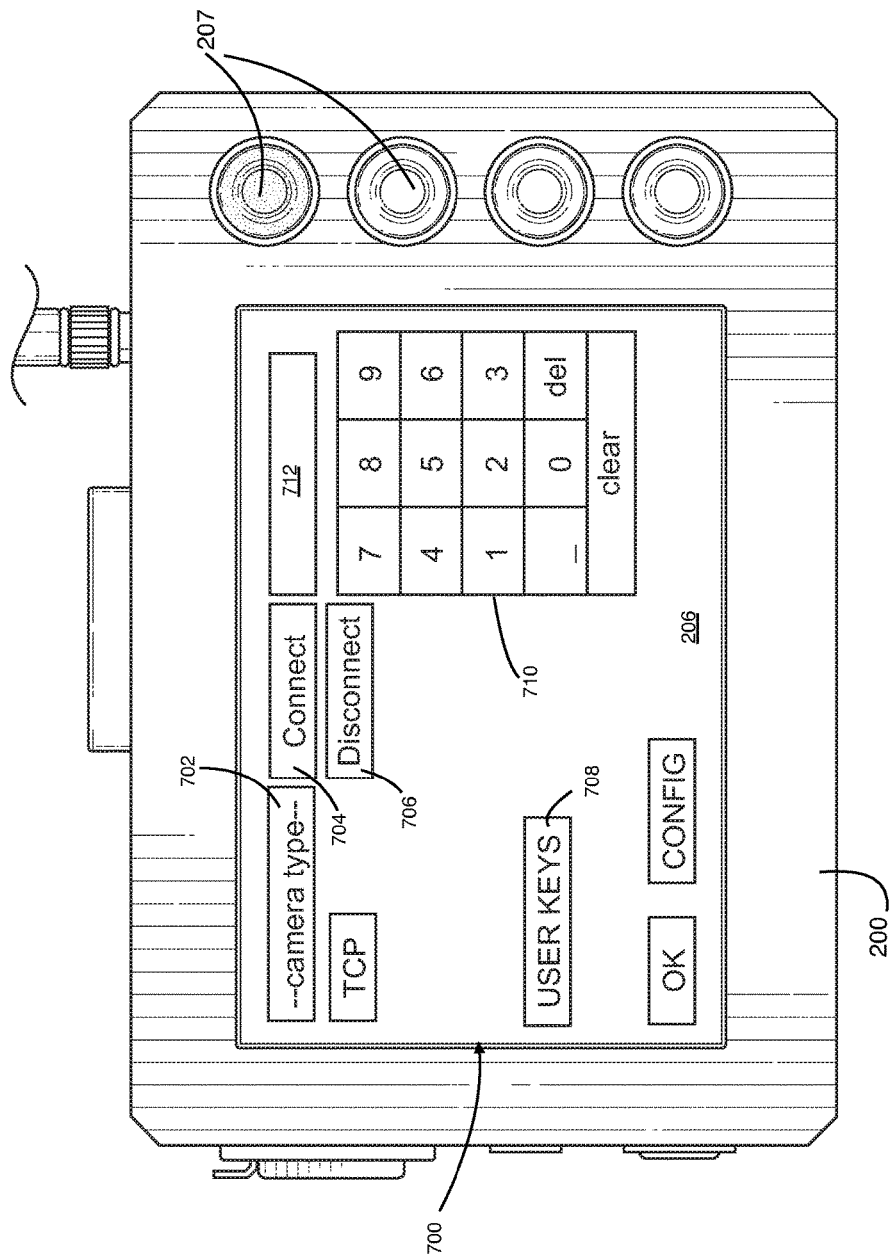
FIG. 7 illustrates an exemplary user interface for the system and method for controlling a plurality of different types of video recorders.

With reference to FIG. 6, the display of the controller may enable a user to navigate through various menus as well as alternatively access each of the control panels respectively associated with the cameras linked to the controller. For instance, a main menu (block 600) may be presented. One embodiment of such a main menu is illustrated in FIG. 7. The main menu 700 may present a user with selectable commands to, for instance, select or identify a camera type 702, connect the camera to the controller 704, disconnect the camera from the controller 706, and even navigate to other embodiments of the display by inputting predetermined user keys 708. In some embodiments, a keypad 710 may be provided to enable a user to enter information such as a camera's serial number, his own identifying credentials, and/or other information, which may be displayed in a text box 712. Of course, it will be understood by one skilled in the art that various other additional and even different functionalities may be displayed and accessible on the main menu. It is additionally contemplated that such functionalities may be utilized either in conjunction with or independently from the functionality achieved by any buttons 207 formed on the control housing 200. Thus foregoing elements are offered by way of example only, and not of limitation.

Returning to FIG. 6, control panels 610, 630, 650 associated with each camera linked to the controller may be accessed from the main menu 600. Although control panels 610, 630, 650 associated with a first, second, and third camera are depicted, it is to be understood that the number of control panels generated may vary to reflect the number of cameras linked to the camera. Thus, there may be one (1) control panel generated in the event that a single camera is linked to the controller. Likewise, there may be two (2) control panels generated in the event that two (2) cameras are linked to the controller. In such a case, one each of the control panels will respectively display status information and enable control of one each of the linked cameras. The number of control panels illustrated and discussed is limited simply for the sake of brevity and to enable the disclosure. It will be understood that as few as one camera may be linked to the controller, and as many cameras as desired may also be linked to the controller.

It is contemplated that once generated, each control panel may be optionally and alternatively selected from, for example, the main menu 600 to populate the display of the controller. In other embodiments, each control panel may be optionally and alternatively be selected from whichever screen populates the display at the time of use, such as another particular camera control panel.

Each control panel 610, 630, 650 may display camera information, such as the status of the camera and various camera settings. In addition, various commands affecting the operation of the camera associated with a particular control panel may be available to the user. For example, from a selected control panel, a user may cause the controller to receive instructions to record video footage from the associated camera, playback a recording previously made from the associated camera, and even change various settings on the associated camera.

Figure 8:
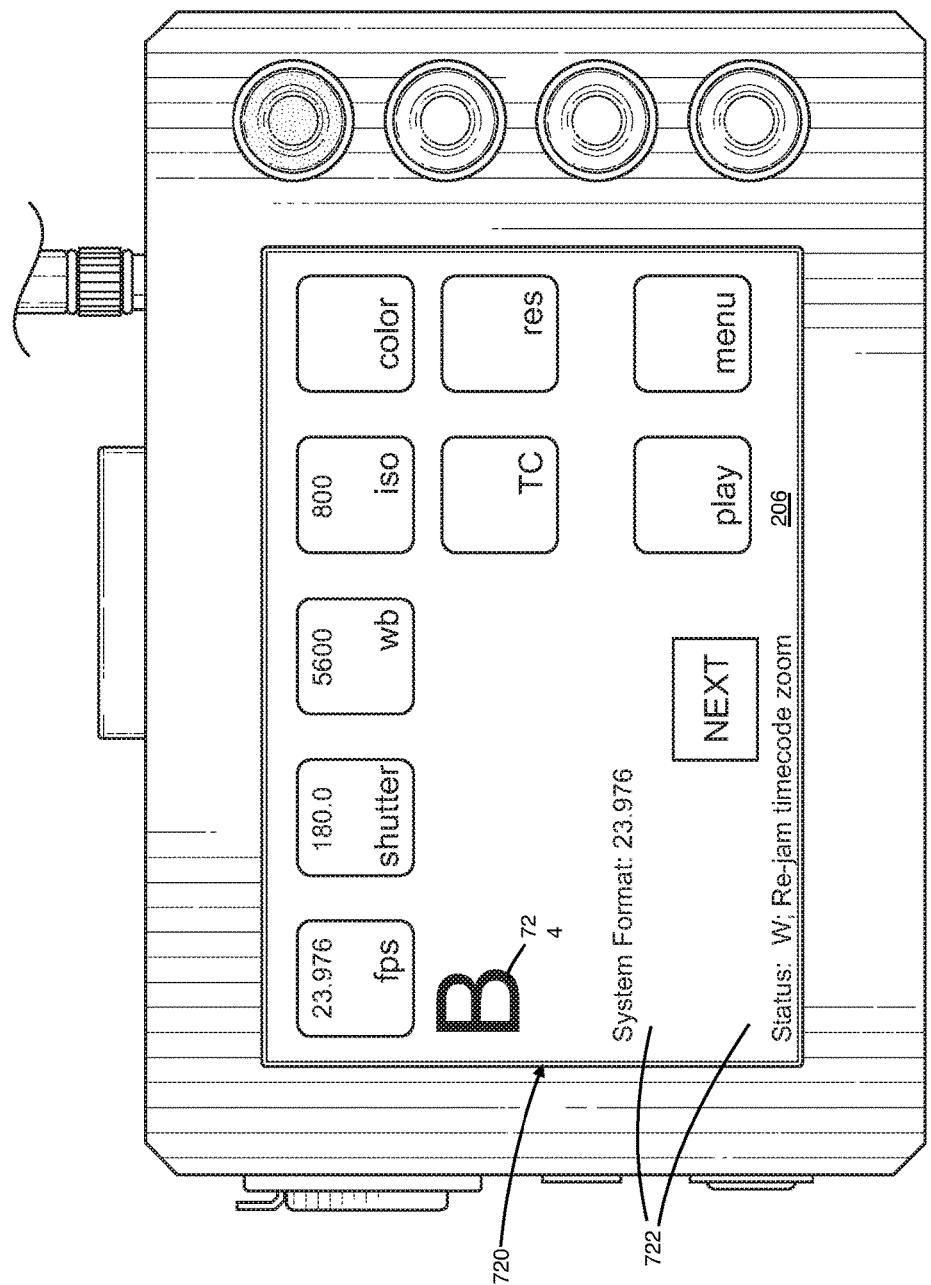
FIG. 8 illustrates another exemplary user interface for the system and method for controlling a plurality of different types of video recorders.

One embodiment of a control panel is illustrated in FIG. 8. In particular, it may be seen that some status information 722 may be provided in alphanumeric characters shown on the display. One skilled in the art will recognize that such status information may be displayed in short hand in accordance with industry standards and/or other characters recognized by or teachable to users of the device, and further, that such status information may vary based on the type of camera connected and even type of status information desired by the user. Thus the particular form and content of the status information should not limit the disclosure.

An identifying character 724 or other means of distinction may also be displayed in the control panel 720 to indicate which of any linked cameras are associated with the displayed control panel. Here, the identifying character 724 is a "B" is shown to identify the associated camera as camera B, however, it is contemplated that a camera name, a number, or even a serial number may be provided to identify the camera associated with the particular control panel instead.

In some embodiments, a setting that is changeable from the control panel associated with a linked camera may be made accessible to the user by a selectable button. The settings may comprise, for example and without limitation, frames per second ("fps"), shutter speed ("shutter"), white balance ("wb"), ISO ("iso"), whether the camera is recording in color or black and white ("color"), a time code ("TC"), and resolution ("res"), among other possible settings. Specifications associated with the setting may further be displayed on the control panel 720 in conjunction with its respective selectable button. As an example, the frames per second ("fps"), also known as frame rate, is shown to be set as 23.976. This particular frame rate is known in the art for filming footage intended for standardized TV and video distribution, though of course, other frame rates are achievable and may even be desirable when using digital video cameras. As another example, the white balance ("wb"), also known as color temperature, is typically adjusted to ensure that any white objects filmed appear white in a recording and is shown to be set at 5600. This particular value is commonly associated with filming that occurs in settings lit by mid-day sunlight, and one skilled in the art will recognize that such values may range under other lighting conditions from about 2000 to about 9000.

In some embodiments, selectable buttons may also be provided to allow a user to play footage ("play") recorded from an associated camera, and even return to the main menu ("menu") discussed above.

Returning again to FIG. 6, it may be seen that from each of the control panels 610, 630, 650 generated for one each of the linked cameras, a plurality of settings unique to each camera, such as those discussed above, may be accessed. Thus, from a control panel associated with a first camera 610, a user may access and adjust any of the first camera's resolution 612, film speed 614, frames rate 616, shutter speed 618, color 622, white balance 624, and time code menu 626. Similarly, from a control panel associated with a second camera 630, a user may access and adjust any of the first camera's resolution 632, film speed 634, frames rate 636, shutter speed 638, color 642, white balance 644, and time code menu 646, and from a control panel associated with a third camera 650, a user may access and adjust any of the first camera's resolution 652, film speed 654, frames rate 656, shutter speed 658, color 662, white balance 664, and time code menu 666. One skilled in the art will recognize that although three cameras are described, the same is true for any additional cameras linked to the controller. Additionally, some settings may not be adjustable from some cameras, and others still may feature additional adjustable settings. Thus, the foregoing settings are offered for example only.

Figure 9:
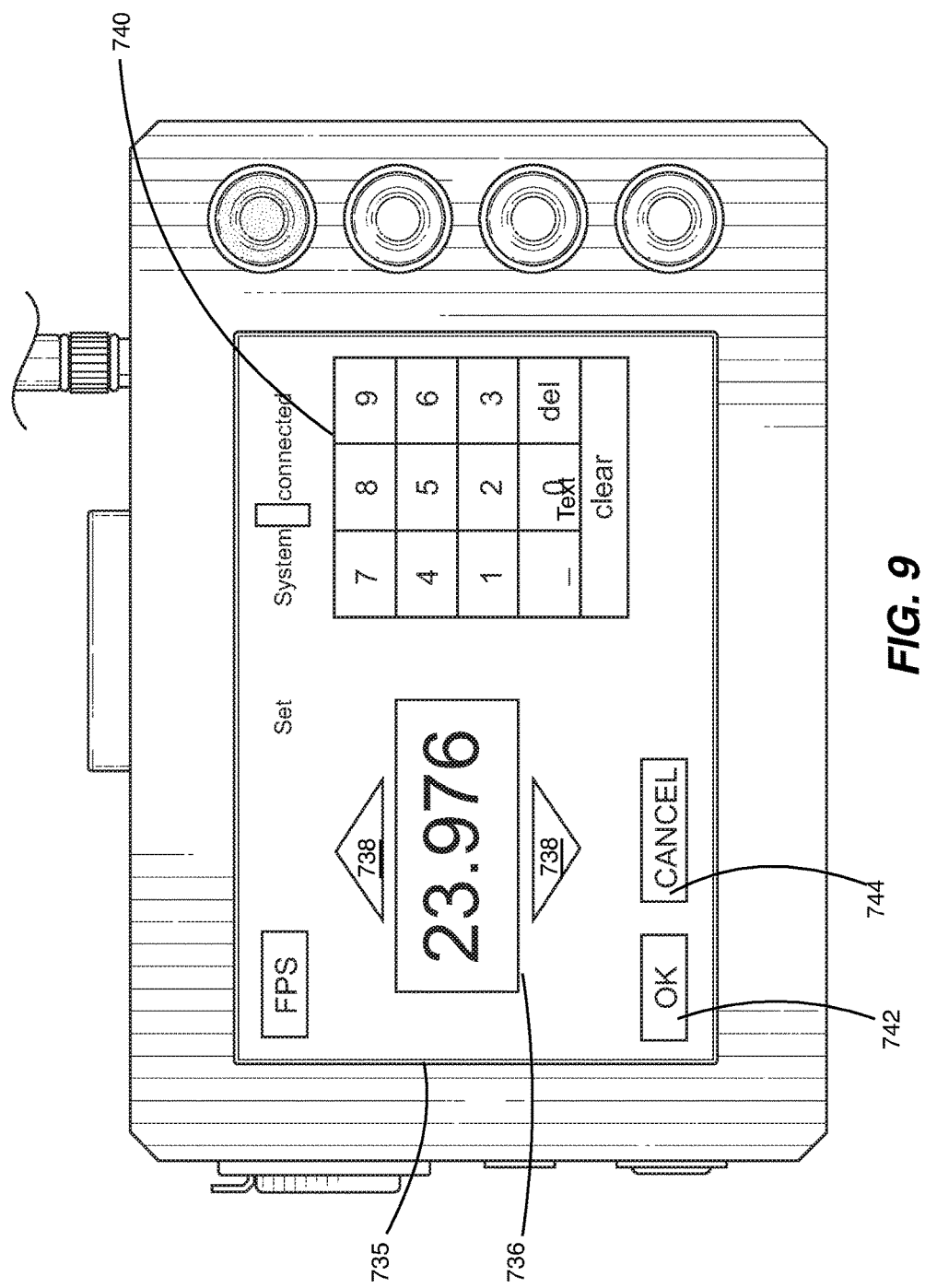
FIG. 9 illustrates yet another exemplary user interface for the system and method for controlling a plurality of different types of video recorders.

It is contemplated that each particular setting may have its own setting page, accessible to alter a selected setting associated with one of the linked cameras. It may be seen in FIG. 9, for example, that one embodiment of a settings page 735 may indicate which setting is being altered or viewed. Indeed, "FPS" may indicate that the frames per second, also known as frame rate, is adjustable in this page and may have been accessed by selecting an "fps" button in a related control panel, such as that shown in FIG. 8. The setting may be displayed in numerals or other characters 736, and may be adjusted by accessing arrows 738 to increase or decrease the printed rate. A key pad 740 may also be provided to enable a user to manually enter a particular frame rate or other applicable setting value. Additionally, buttons may be accessible to confirm a new frame rate, as in "OK" 742, or may be provided to cancel 744 the selection, leaving a prior setting in place. If confirmed, the altered setting may be transmitted from the control device, or controller, to the communicatively linked camera that it is associated with so that the associated camera continues operation under the newly adjusted setting.

As above, it is to be understood that various other functionality may be provided to alter settings depending on the setting page. As one example, a list of selectable, commonly used frame rates may be provided. Additionally, it will be understood that displays associated with other setting options may appear differently than the one illustrated.

In some embodiments, choosing to either confirming or cancel a setting adjustment may cause the controller to display the associated camera's control page. Then, from the control page, a user can select another setting he or she wishes to adjust or alter for the same camera, instruct the controller to access a control panel associated with another camera, or even the main menu.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the quantity and quality of available settings may change depending on the type of camera linked to the controller. Additionally, the display may appear in various forms. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the system, method and apparatus for independently controlling different cameras from a single device with which that terminology is associated. In general, the terms used in the following claims should not be constructed to limit the system, method and apparatus for independently controlling different cameras from a single device to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the system, method, and apparatus for independently controlling different cameras from a single device is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the system, method and apparatus for controlling different cameras from a single device name.

What is claimed is:

1. A system for independently controlling a plurality of cameras from a single device, comprising:
    two or more video-capable cameras; and
    a remote control device operable to:
        communicatively link to the two or more cameras, wherein at least one camera utilizes at least one manufacturer-specific protocol, and wherein the at least one manufacturer-specific protocol is configured to enable at least one device to control at least one setting of at least one camera;
        generate a unique control panel for each of the communicatively linked cameras, wherein at least one control panel utilizes at least one of the at least one manufacturer-specific protocols to control at least one setting of at least one camera;
        display at least one of the control panels;
        receive instructions via at least one displayed control panel, wherein the instructions are configured to utilize at least one manufacturer-specific protocol to adjust one or more settings of at least one camera;
        translate the instructions into an appropriate programming language for the at least one camera using the at least one manufacturer-specific protocol; and
        transmit the instructions to the at least one camera associated with the at least one displayed control panel to cause the at least one camera associated with the control panel to operate under the one or more adjusted settings.

2. The system of claim 1, wherein at least one of the cameras communicatively linked to the control device defines a different type of camera than at least one other of the communicatively linked cameras.

3. The system of claim 1, wherein the control device is further operable to generate a unique settings page for one or more each of the adjustable settings accessible from each of the control panels generated for each of the communicatively linked cameras.

4. A method for independently controlling a plurality of cameras from a single device, comprising:
    receiving identifying camera information to cause a camera to become communicatively linked to a control device, wherein at least one camera utilizes at least one manufacturer-specific protocol, and wherein the at least one manufacturer-specific protocol is configured to enable at least one device to control at least one setting of at least one camera;
    generating a digital control panel unique to the linked camera, wherein at least one control panel utilizes at least one of the at least one manufacturer-specific protocols to control at least one setting of at least one camera;
    receiving identifying camera information to cause one or more additional cameras to become communicatively linked to the control device;
    generating a digital control panel unique to each additional linked camera;
    responsive to receiving a selection of one of the linked cameras, displaying the digital control panel generated in conjunction with said linked camera;
    receiving one or more setting adjustments for the selected camera from the control panel;
    translating the one or more settings adjustments into an appropriate programming language for the at least one camera using at least one manufacturer-specific protocol; and
    transmitting the one or more settings adjustments to the selected camera to cause the selected camera to operate under the adjusted settings.

5. The method of claim 4, wherein at least one of the additional cameras communicatively linked to the control device defines a different type of camera than any other camera communicatively linked to the control device.

6. A non-transitory, tangible computer-readable medium having stored thereon computer-executable instructions, which, when executed by a computer processor, enable performance of the method, comprising:
    receiving identifying camera information to cause a camera to become communicatively linked to a control device, wherein at least one camera utilizes at least one manufacturer-specific protocol, and wherein the at least one manufacturer-specific protocol is configured to enable at least one device to control at least one movement of at least one camera;
    generating a digital control panel unique to the linked camera;
    receiving identifying camera information to cause one or more additional cameras to become communicatively linked to the control device;
    generating a digital control panel unique to each additional linked camera;

responsive to receiving a selection of one of the linked cameras, displaying the digital control panel generated in conjunction with said linked camera;

receiving one or more setting adjustments for the selected camera from the control panel;

translating the one or more settings adjustments into an appropriate programming language for the at least one camera using at least one manufacturer-specific protocol; and transmitting the one or more setting adjustments to the selected camera to cause the selected camera to operate under the adjusted settings.

7. The system of claim 1, wherein the instructions are transmitted via at least one wired connection, at least one wireless connection, or both at least one wired connection and at least one wireless connection.

8. The method of claim 4, wherein the one or more setting adjustments are transmitted via at least one wired connection, at least one wireless connection, or both at least one wired connection and at least one wireless connection.

9. The medium of claim 6, wherein the one or more setting adjustments are transmitted via at least one wired connection, at least one wireless connection, or both at least one wired connection and at least one wireless connection.

10. The system of claim 1, wherein the remote control device is configured to utilize a plurality of manufacturer-specific protocols.

11. The method of claim 4, wherein the remote control device is configured to utilize a plurality of manufacturer-specific protocols.

12. The medium of claim 6, wherein the remote control device is configured to utilize a plurality of manufacturer-specific protocols.

* * * * *